US012670289B2

(12) United States Patent
Li et al.

(10) Patent No.: US 12,670,289 B2
(45) Date of Patent: Jun. 30, 2026

(54) MANAGEMENT OF OBJECT METADATA ACROSS DATA SOURCES AND STORAGE SYSTEMS

(71) Applicant: Databricks, Inc., San Francisco, CA (US)

(72) Inventors: Zhaoxing Li, Mountain View, CA (US); Sarah Cai, Cupertino, CA (US)

(73) Assignee: Databricks, Inc., San Francisco, CA (US)

( * ) Notice: Subject to any disclaimer, the term of this patent is extended or adjusted under 35 U.S.C. 154(b) by 62 days.

(21) Appl. No.: 18/934,106

(22) Filed: Oct. 31, 2024

(65) Prior Publication Data

US 2026/0119695 A1 Apr. 30, 2026

(51) Int. Cl.
G06F 21/62 (2013.01)
G06F 21/60 (2013.01)

(52) U.S. Cl.
CPC ........ G06F 21/6227 (2013.01); G06F 21/604 (2013.01)

(58) Field of Classification Search
CPC ........................... G06F 21/6227; G06F 21/604
See application file for complete search history.

(56) References Cited

U.S. PATENT DOCUMENTS 11,030,556 B1 * 6/2021 Mann ............. G06Q 10/063114
2003/0023868 A1 * 1/2003 Parent ................. G06F 21/6218
707/999.009

2004/0250098 A1 * 12/2004 Licis ..................... G06F 21/604
713/193
2010/0174751 A1 * 7/2010 Kawano .............. G06F 21/6218
715/847
2018/0332138 A1 11/2018 Liu et al.
2019/0155801 A1 5/2019 Karunanithi et al.
2020/0193037 A1 * 6/2020 Peng ..................... G06F 21/604
2025/0124045 A1 * 4/2025 Shtern ................... G06F 16/256

FOREIGN PATENT DOCUMENTS

CN 109522139 A 3/2019
CN 117421371 A 1/2024
CN 120180484 A 6/2025

OTHER PUBLICATIONS

Patent Cooperation Treaty, International Search Report and Written Opinion, International PCT Application No. PCT/US25/042680, Nov. 17, 2025, 14 pages.

* cited by examiner

*Primary Examiner* — Ponnoreay Pich
(74) *Attorney, Agent, or Firm* — Fenwick & West LLP

(57) ABSTRACT

A system receives, from a client device of a user, a request to create a target data table in a remote data source. The system determines whether the user has a permission to create, in a local database, a local data table corresponding to the target data table. Responsive to determining that the user has the permission, the system creates the local data table associated with a state identifier data structure and sets the state identifier data structure to a provisioning state to indicate that the target data table is being provisioned. The system transmits an instruction to create the target data table in the remote data source. Responsive to determining that the target data table is created in the remoted data source successfully, the system changes the local data table from the provisioning state to an active state.

20 Claims, 12 Drawing Sheets

800

Catalog Explorer > builtin_hms_catalog > hms_fed_paul >

▦ foo_table2 ▢ ☆                                    [ Open in a dashboard ⌄ ] [ Create ⌄ ]

Overview   Sample Data   Details   Permissions   History   Lineage   Insights   Quality          •••                    ⌃

[ 🔍 Filter columns... ]

| Column | Type | Comment | Tags | Column masking rule |
|--------|------|---------|------|---------------------|
| id     | int  | ⊕       | ⊕    | ✏                   |
| col2   | int  | ⊕       | ⊕    | ✏                   |

About this table

| State         | ⊘ Active       |
|---------------|--------------------|
| Owner         | Paul.... ✏         |
| Data source   | △ Delta            |
| Popularity    | ▂▃▄                |
| Last updated  | last month         |
| Size          | 834B, 2 files      |

Quality

[ Add monitor ]

FIG. 8

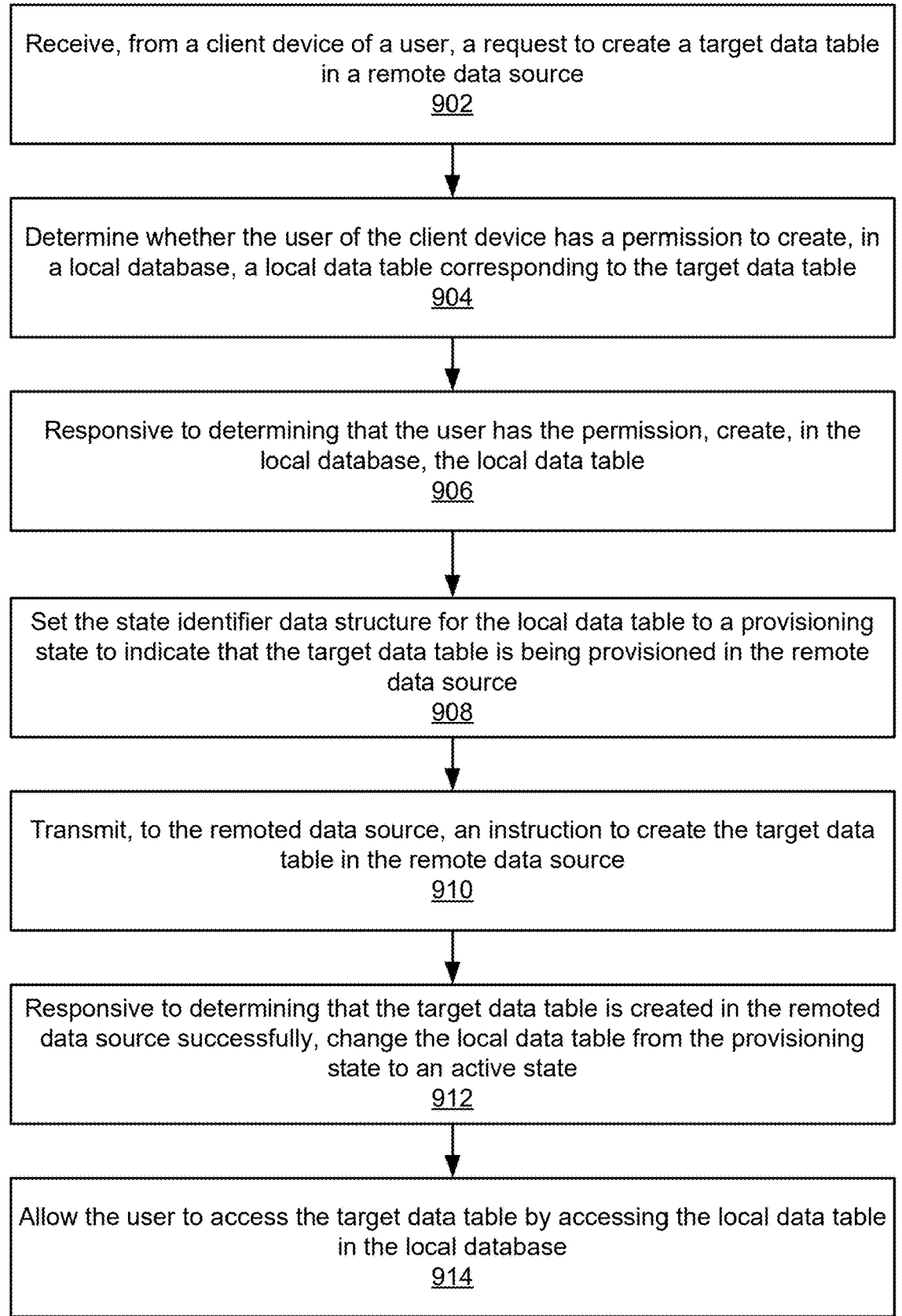

Receive, from a client device of a user, a request to create a target data table in a remote data source
902

Determine whether the user of the client device has a permission to create, in a local database, a local data table corresponding to the target data table
904

Responsive to determining that the user has the permission, create, in the local database, the local data table
906

Set the state identifier data structure for the local data table to a provisioning state to indicate that the target data table is being provisioned in the remote data source
908

Transmit, to the remoted data source, an instruction to create the target data table in the remote data source
910

Responsive to determining that the target data table is created in the remoted data source successfully, change the local data table from the provisioning state to an active state
912

Allow the user to access the target data table by accessing the local data table in the local database
914

FIG. 9A

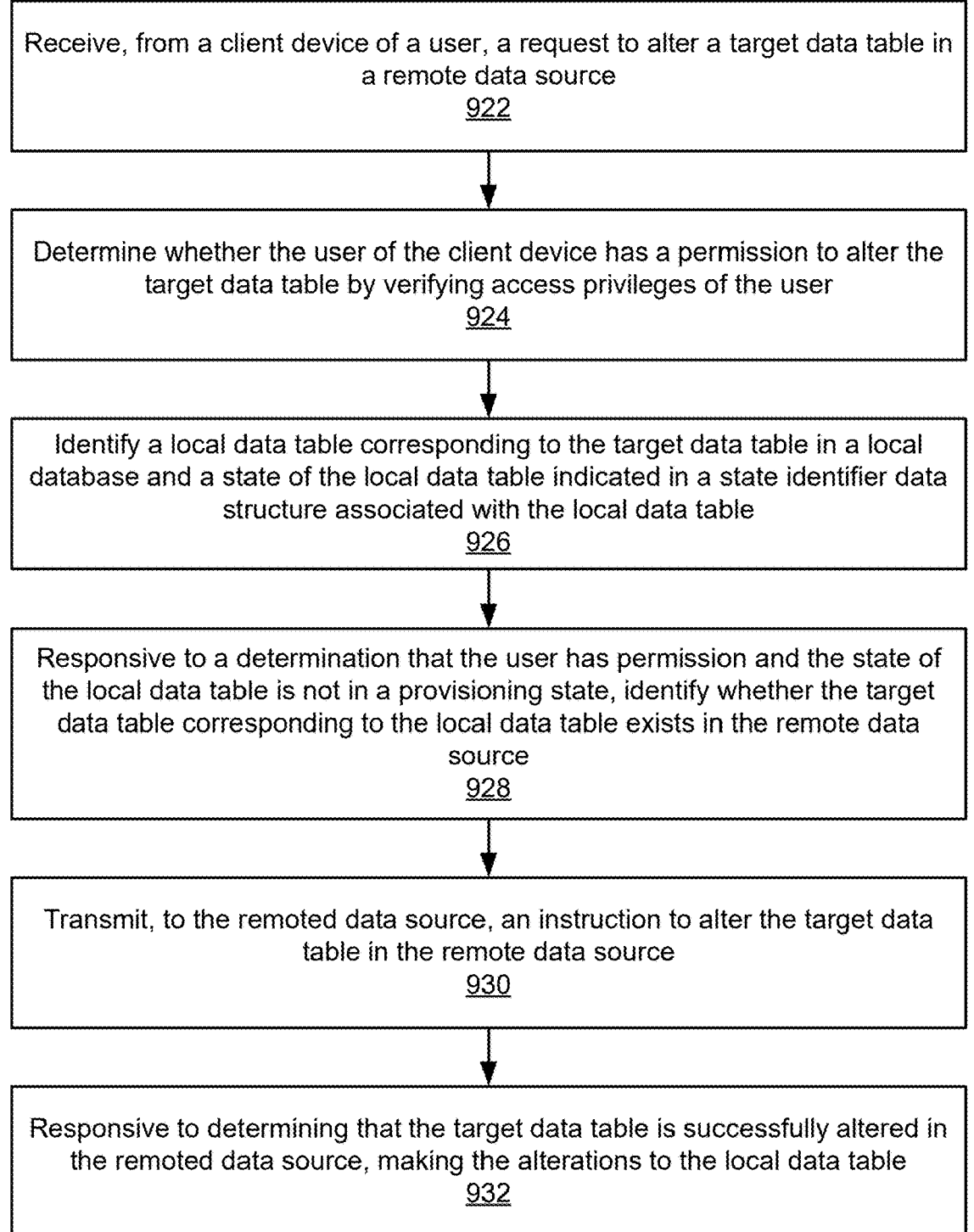

Receive, from a client device of a user, a request to alter a target data table in a remote data source
922

Determine whether the user of the client device has a permission to alter the target data table by verifying access privileges of the user
924

Identify a local data table corresponding to the target data table in a local database and a state of the local data table indicated in a state identifier data structure associated with the local data table
926

Responsive to a determination that the user has permission and the state of the local data table is not in a provisioning state, identify whether the target data table corresponding to the local data table exists in the remote data source
928

Transmit, to the remoted data source, an instruction to alter the target data table in the remote data source
930

Responsive to determining that the target data table is successfully altered in the remoted data source, making the alterations to the local data table
932

FIG. 9B

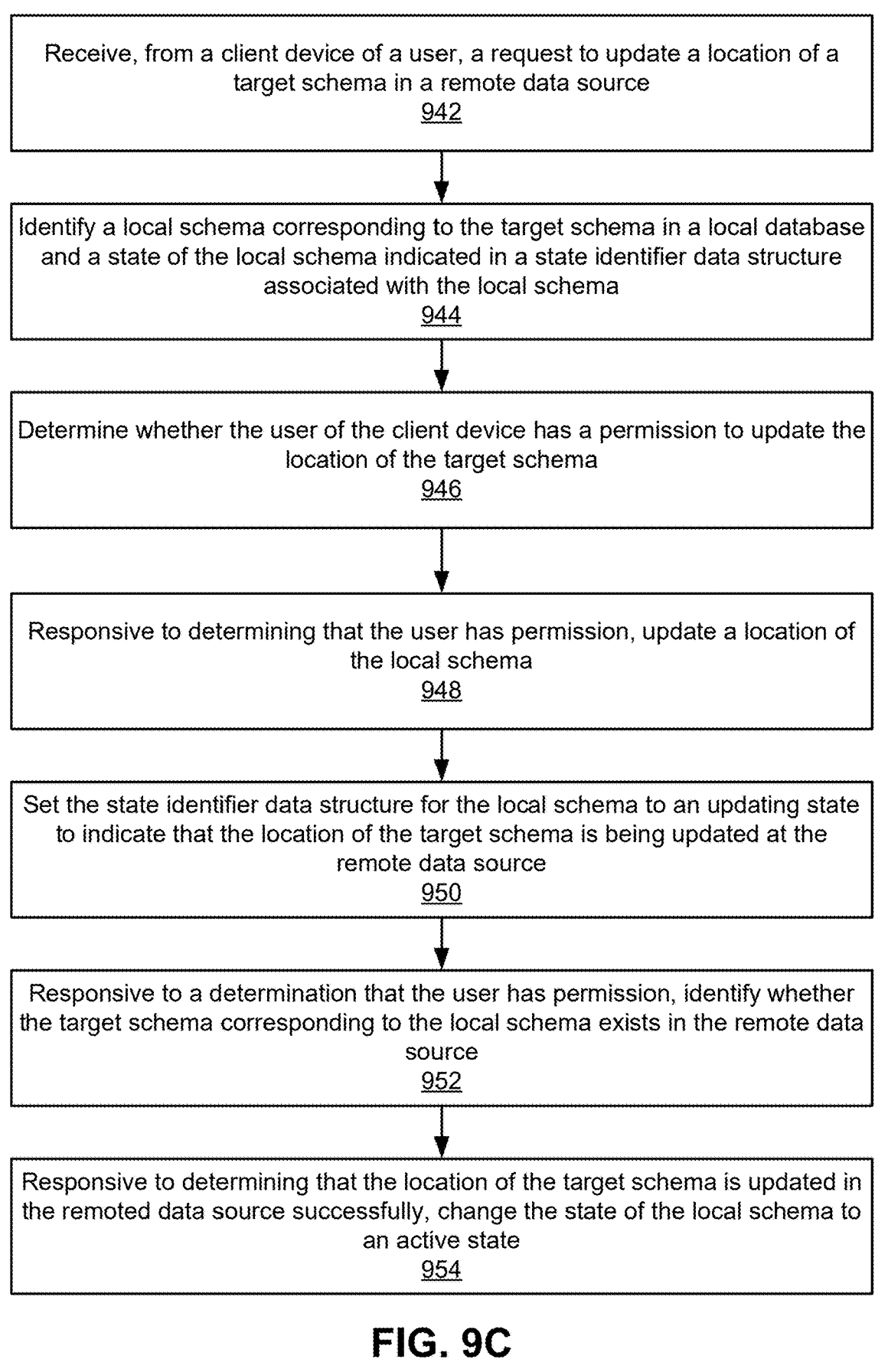

Receive, from a client device of a user, a request to update a location of a target schema in a remote data source
942

↓

Identify a local schema corresponding to the target schema in a local database and a state of the local schema indicated in a state identifier data structure associated with the local schema
944

↓

Determine whether the user of the client device has a permission to update the location of the target schema
946

↓

Responsive to determining that the user has permission, update a location of the local schema
948

↓

Set the state identifier data structure for the local schema to an updating state to indicate that the location of the target schema is being updated at the remote data source
950

↓

Responsive to a determination that the user has permission, identify whether the target schema corresponding to the local schema exists in the remote data source
952

↓

Responsive to determining that the location of the target schema is updated in the remoted data source successfully, change the state of the local schema to an active state
954

FIG. 9C

MANAGEMENT OF OBJECT METADATA ACROSS DATA SOURCES AND STORAGE SYSTEMS

TECHNICAL FIELD

The disclosed configuration relates generally to data storage technology, and more particularly to management of object metadata for writes to remote data sources.

BACKGROUND

A data processing service may manage a significant amount of data for one or more entities in various forms, such as raw data or data tables. Users access the data processing service to perform operations (e.g., a query operation) on the data that is stored at a remote data source managed, by example, by a foreign data system. Similarly to the data processing service, the foreign data system may also manage a metastore governing access and privileges to various data objects stored in the remote data source for users of the foreign data system. The foreign data system may differ from the data processing service with respect to how data objects are accessed and written. Often times, one or more data operations may be executed on data from the remote data source using services of the data processing service.

To return the results of the operations to the users of the foreign data system, the data processing service consumes a significant amount of resources, time and manpower to provide integration solutions that allow users of the foreign data system to consume the results. Moreover, in other instances, an account (e.g., customer) of the foreign data system may desire to migrate their data and applications from the foreign data system to the data processing service. However, the migration process is typically incremental, and users associated with the account may still have to perform read/write operations within both infrastructures. In such an instance, there needs to be a way to efficiently communicate results of performing data operations at the data processing service on data from the remote data source.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a data processing service, in accordance with an embodiment.

FIG. 8 is an example user interface presenting information of data objects in a metastore, in accordance with an embodiment.

FIG. 9A is a flowchart of a method for creating a target data table in a remote data source by using the unity catalog, in accordance with an embodiment.

FIG. 9B is a flowchart of a method for altering a target data table in a remote data source by using the unity catalog, in accordance with an embodiment.

FIG. 9C is a flowchart of a method for altering a schema location in a remote data source by using the unity catalog, in accordance with an embodiment.

DETAILED DESCRIPTION

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The disclosed configurations beneficially provide a computer system (and/or a method) for creating, updating, or deleting a data table in a remote data source via a metastore in a local database. In one instance, upon receiving a request to create a target data table in a remote data source from a client device of a user, the configuration determines whether the user has a permission to create a local data table in the local database. The local data table in the local database corresponds to the target data table in the remote data source. Responsive to determining that the user has the permission, the configuration creates the local data table associated with a state identifier data structure and sets the state identifier data structure to a provisioning state to indicate that the target data table is being provisioned. The configuration then transmits an instruction to create the target data table in the remote data source. Responsive to determining that the target data table is created in the remoted data source successfully, the configuration changes the local data table from the provisioning state to an active state indicating that the user can access the target data table in the remote data source by accessing the local data table in the metastore of the local database.

Figure 1:
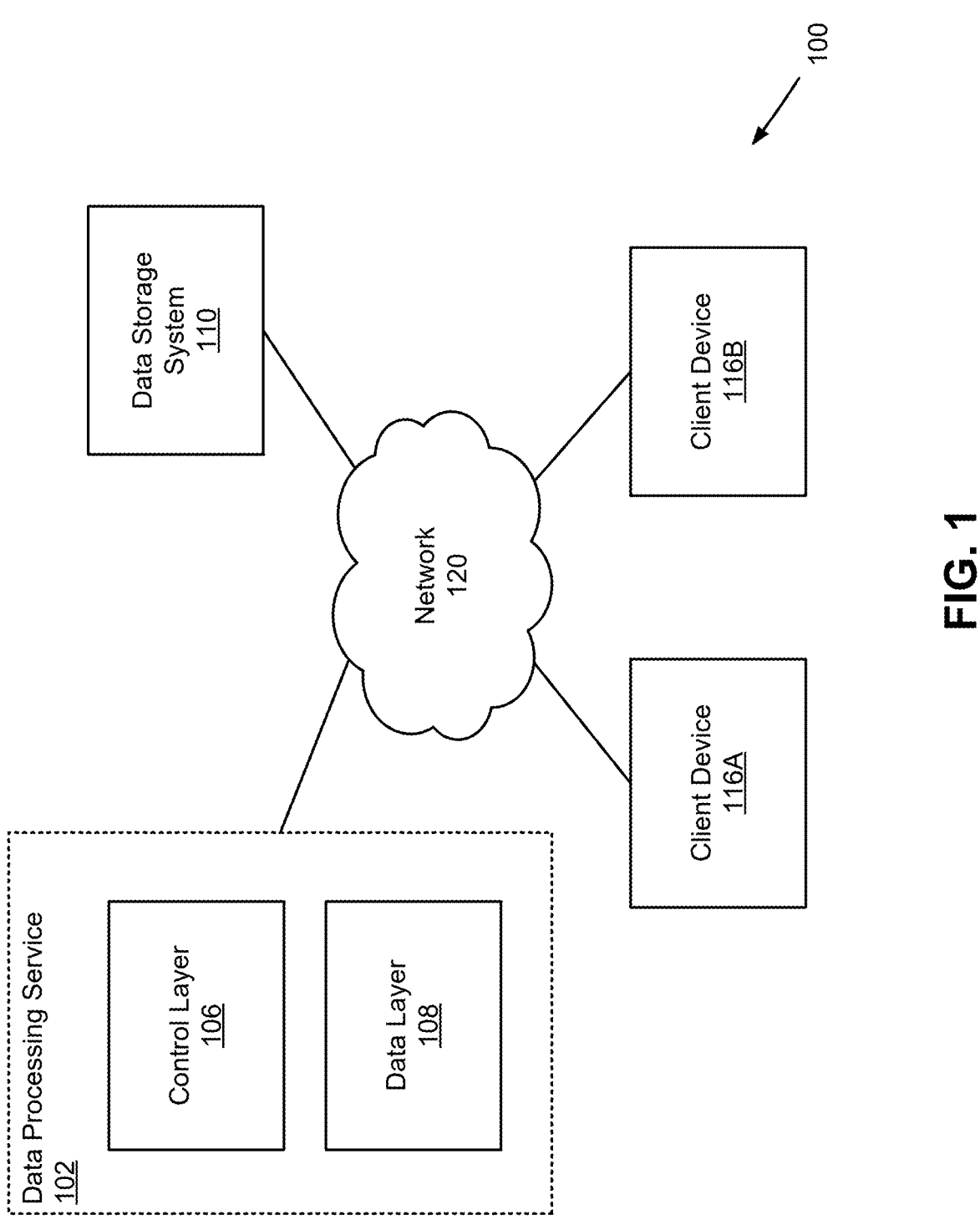

Figure (FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 1000 as described with FIG. 10. In some embodiments, the computing devices may be configured with software to function as specifically described herein. For example, program code comprised of instructions may cause a processing system to be structured in a manner so that the device operates the specific functionality upon execution of the program code.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include compute resources for executing the jobs. An example of a compute resource is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In one embodiment, the compute resources of the data processing service 102 that access data in the data lake includes a transactional layer (e.g., group of software functionalities) that performs various functionalities, including retrieving the data relevant to the request, performing transaction management to update changes to a data table that comply with atomicity, consistency, isolation, and durability (ACID) transaction properties, and the like. The transactional layer may be configured within a compute resource of the control layer 106 and/or the data layer 108.

Moreover, since data in the data storage system 110 (e.g., cloud object data store) stores unstructured data in addition to structured data, it is difficult to interact with the data in a data lake compared to data stored in, for example, a structured database. Thus, the transaction layer also generates and maintains one or more metadata files in association with the data files of a data table that allow the transaction layer to navigate the data storage system 110 to retrieve and write data desired by users. Therefore, the data files and/or metadata files of a data table may be stored according to different formats (e.g., schema, organization of files), and a compute resource is able to interact with the data if configured with the transactional layer for that format that includes, for example, libraries for reading or writing data in that format, and the like.

The data storage system 110 includes a device (e.g., a disc drive, a hard drive, a semiconductor memory) used for storing database data (e.g., a stored data set, at least a portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102, for example, a customer or user of the data processing service 102. In another embodiment, the data management system 110 may be managed by the same entity that manages the data processing service 102. Therefore, coupled with the serverless implementation of compute resources of the data layer 108, the data processing service 102 may manage access controls to user data stored in the data storage system 110, maintenance tasks for the user data, and the like so that an entity user of the data processing service 102 without separately configuring and deploying infrastructure.

In one embodiment, the data processing service 102 may manage a significant amount of data for one or more entities in various forms, such as raw data or data tables. Users access the data processing service 102 to perform operations (e.g., a query operation) on the data that is stored at a remote data source managed, by example, by a foreign data system. Similar to the data processing service 102, the foreign data system may also manage a metastore governing access and privileges to various data objects stored in the remote data source for users of the foreign data system. However, the foreign data system may differ from the data processing service with respect to how data objects are accessed and written as the foreign data system may have a different infrastructure and different set of services from the data processing service 102. Often times, one or more data operations may be executed on data from the remote data source using services of the data processing service 102. For example, a user may like to take advantage of an ETL service only accessible by the data processing service 102, but the data for the operations may be stored at the remote data storage.

To return the results of the operations to the users of the foreign data system, the data processing service 102 consumes a significant number of resources to provide, for example, integration solutions that allow users of the foreign data system to consume the results of the operations that result in a significant amount of time and manpower. Moreover, in other instances, an account (e.g., customer) of the foreign data system may desire to migrate their data and applications from the foreign data system to the data processing service 102. However, the migration process is typically incremental, and the users associated with the account may have to perform read/write operations within both infrastructures. In such an instance, there needs to be a way to efficiently communicate results of performing data operations at the data processing service 102 on data from the remote data source.

Thus, in one embodiment, the data processing service 102 provides a system (and/or a method) for creating, updating, or deleting a data table in a remote data source via a metastore in a local database. In one instance, upon receiving a request to create a target data table in a remote data source from a client device of a user, the configuration determines whether the user has a permission to create a local data table in the local database. The local data table in the local database corresponds to the target data table in the remote data source. Responsive to determining that the user has the permission, the configuration creates the local data table associated with a state identifier data structure and sets the state identifier data structure to a provisioning state to indicate that the target data table is being provisioned. The configuration then transmits an instruction to create the target data table in the remote data source. Responsive to determining that the target data table is created in the remoted data source successfully, the configuration changes the local data table from the provisioning state to an active state indicating that the user can access the target data table in the remote data source by accessing the local data table in the metastore of the local database.

Unlike traditional metadata caching, which only stores object metadata (without reflecting real-time changes), the creation of a local table with a state identifier helps synchronize the status of the local table with the remote table's status. When a user requests to create a data object (like a new data table), the system first sets the local data table in a provisioning state. This state serves as a temporary marker that the system is in the process of provisioning the corresponding table in the remote data source. By creating the local table immediately and associating it with a provisioning state, the user can see that the system is working on their request without any confusion. For example, the user may see their request is without any conflict with other users who may attempt to create the same local table in the local database. The local table serves as a placeholder until the remote data table is successfully created. Once the remote table is successfully created, the system switches the state of the local table from "provisioning" to "active". This state change indicates to the user that the local table is now fully functional and represents a live connection to the target data table in the remote data source.

By interacting with the local table, the user essentially accesses the remote data table, but without needing to directly query the remote system each time. This reduces network overhead because repeated operations can be performed on the local table instead of repeatedly querying the remote data source, solving the problem of high network load and latency. Additionally, the disclosed method uses state identifiers to ensure that the local and remote data sources stay in synchronization, as the method tracks the lifecycle of the remote data table, making it clear when the user can start using the new data table via the local database.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 1000 as described with FIG. 10.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Figure 2:
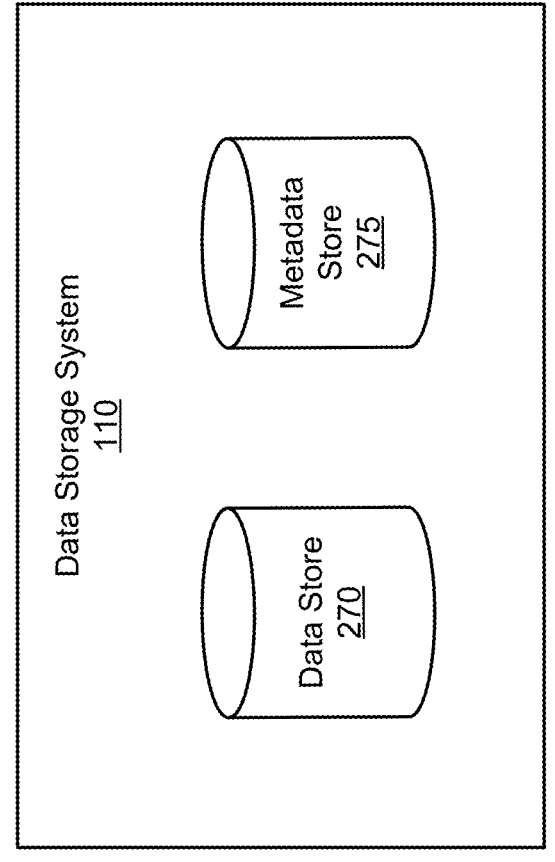
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module 250. The data storage system 108 also includes a data tables store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

In one embodiment, the transaction log for a data table in the metadata store 275 includes one or more log files (e.g., JSON files) that capture a transaction to the data table. A log file may include details of one or more transactions made to a respective set of data files of the data table. For example, the log may include the name of the data file, statistics of the data file including min-max ranges for a set of keys, size of the data file, type of transaction (e.g., write, add, update) committed, and the like. The metadata store 275 may also store one or more checkpoint files for the data table. Specifically, a set of checkpoint files describes the state of a data table at a given point in time by analyzing the transactions recorded in the log files until that time. Therefore, metadata for a data table may be characterized by a set of checkpoint files and one or more log files that describe transactions to the data table committed after the set of checkpoint files were created.

Figure 3:
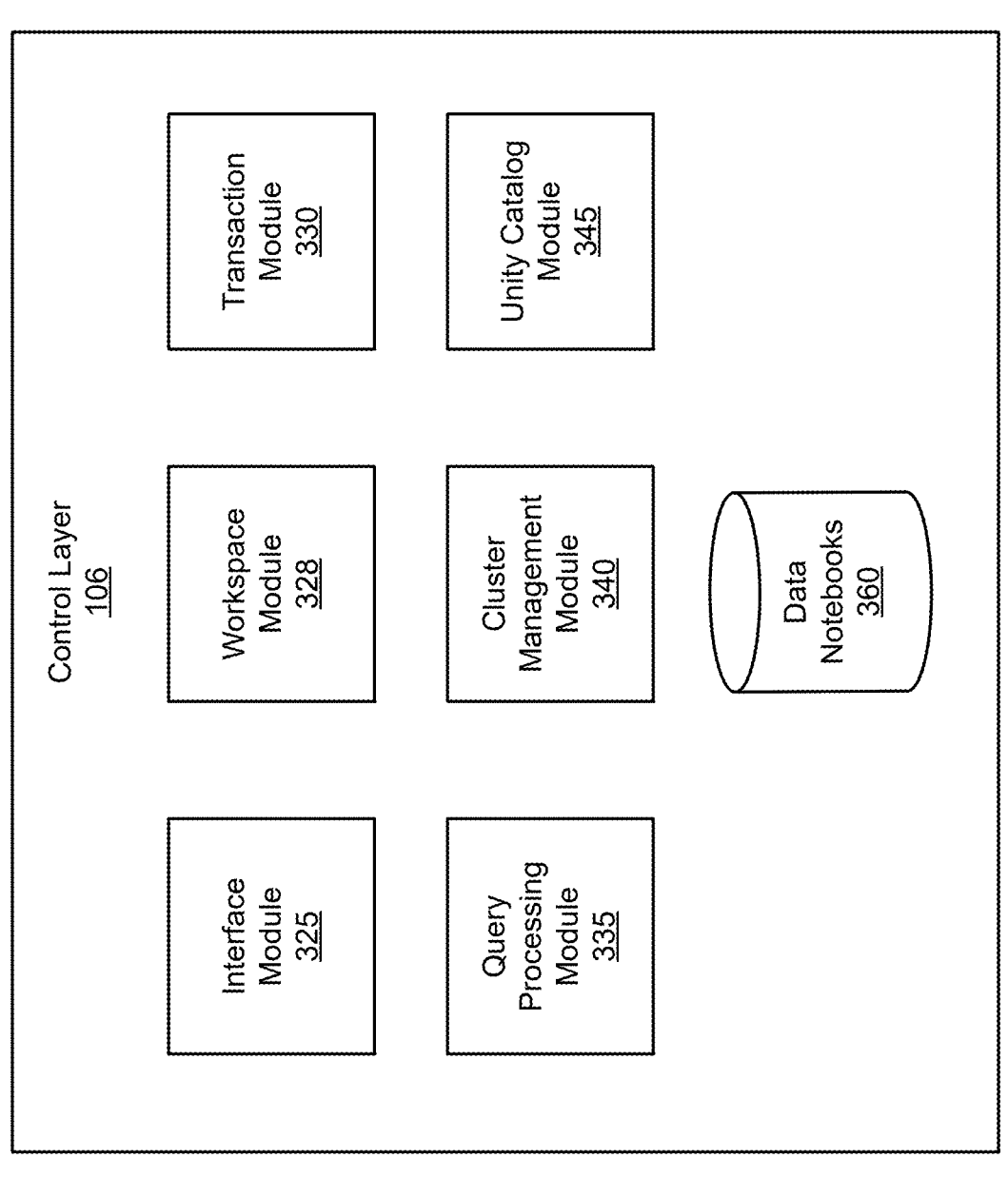
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 325, a transaction module 330, a query processing module 335, and a cluster management module 340. The control layer 106 also includes a data notebook store 360. The modules 325, 330, 335, and 340 may be structured for execution by a computer system, e.g., 1000 having some or all of the components as described in FIG. 10, such that the computer system 1000 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108 and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore (e.g., metadata store 275) for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one example, for a given data table (e.g., with name "tableA_remoteSource") stored in a remote data storage system (e.g., a remote data source), the metastore may store the metadata of the data table, such as a size of the table, names of columns (e.g., user_ID, timestamp, loginID), and the like. This metadata may be "foreign" in the sense that the data objects that are the subject of a query may be managed by a different entity than the data processing service 102. In some implementations, the remote data storage system/remote data source may be located at a geographically remote location from the remote data source.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In some embodiments, the unity catalog module 345 may allow a user to perform an action on a data object (such as, data table, data schema, etc.) in remote data storages/sources. The action may include creating, updating and deleting a target data object in the remote data storage/sources by using the unity catalog module 345. Before performing the actions, the unity catalog module 345 may check whether the user has the credentials/permissions/privileges for performing the actions on the target data object in the remote data source. For example, the unity catalog module 345 may check whether the user has permissions to access the catalog and schema that are associated with the target data object. The unity catalog module 345 may determine whether the user has permissions to create, modify or delete a target data table under a target schema.

In some implementations, the unity catalog module 345 may synchronize a local data object in a local database (e.g., metastore at data processing service 102) with its corresponding remote data object in a remote data source (e.g., data storage system 110). Based on the synchronization status, the unity catalog module 345 may indicate a state of the local data object. For example, the local data object may be in a provisioning state, indicating that the local data object has been created in the local database and the corresponding remote data object is being created in the remote data source. At this state, the unity catalog module 345 has not received a signal indicating the existence of the remote data object in the remote data source, and a user may not perform an action on the local data object with a provisioning state because the corresponding remote data object has not been successfully/completely created. Once the unity catalog module 345 receives the signal indicating the completion of creating the corresponding remote data object or the existence of the remote data object, the unity catalog module 345 may change the local data object to an active state. An active state indicates the existence of the corresponding remote data object, and a user may perform an action on the remote data object via the local data object. In some implementations, the unity catalog module 345 may check/update the states of the local data objects by periodically checking the status of the corresponding remote data objects; and in some implementation, the unity catalog module 345 may check/update the states of the local data objects upon user's requests. The state of a local data object may be determined based on the latest check/update performed by the unity catalog module 345. In some cases, there may be discrepancies between the state indicated by the local data object and the actual state of the corresponding remote data object. For example, a remote data object may have been deleted, but the corresponding local data object may be indicated as an active state until the unity catalog module 345 receives the update of the remote data object from the remote data source. In another example, a remote data object may have been created, the corresponding local data object may have a provisioning state or does not exist until the unity catalog module 345 checks and determines the status of the remote data object.

In some embodiments, the unity catalog module 345 may use a state identifier data structure to indicate a state of the data object in the local database. For example, the state identifier data structure may include an identifier of the data object and its associated state within the data structure. The unity catalog module 345 may use the identifier (name of the object) as the key and store the state as the value associated with that identifier. In one example, a non-existence/failed state may be assigned with value "0", a provisioning state may be assigned with value "1", an active state may be assigned with value "2", and the like.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

Figure 4:
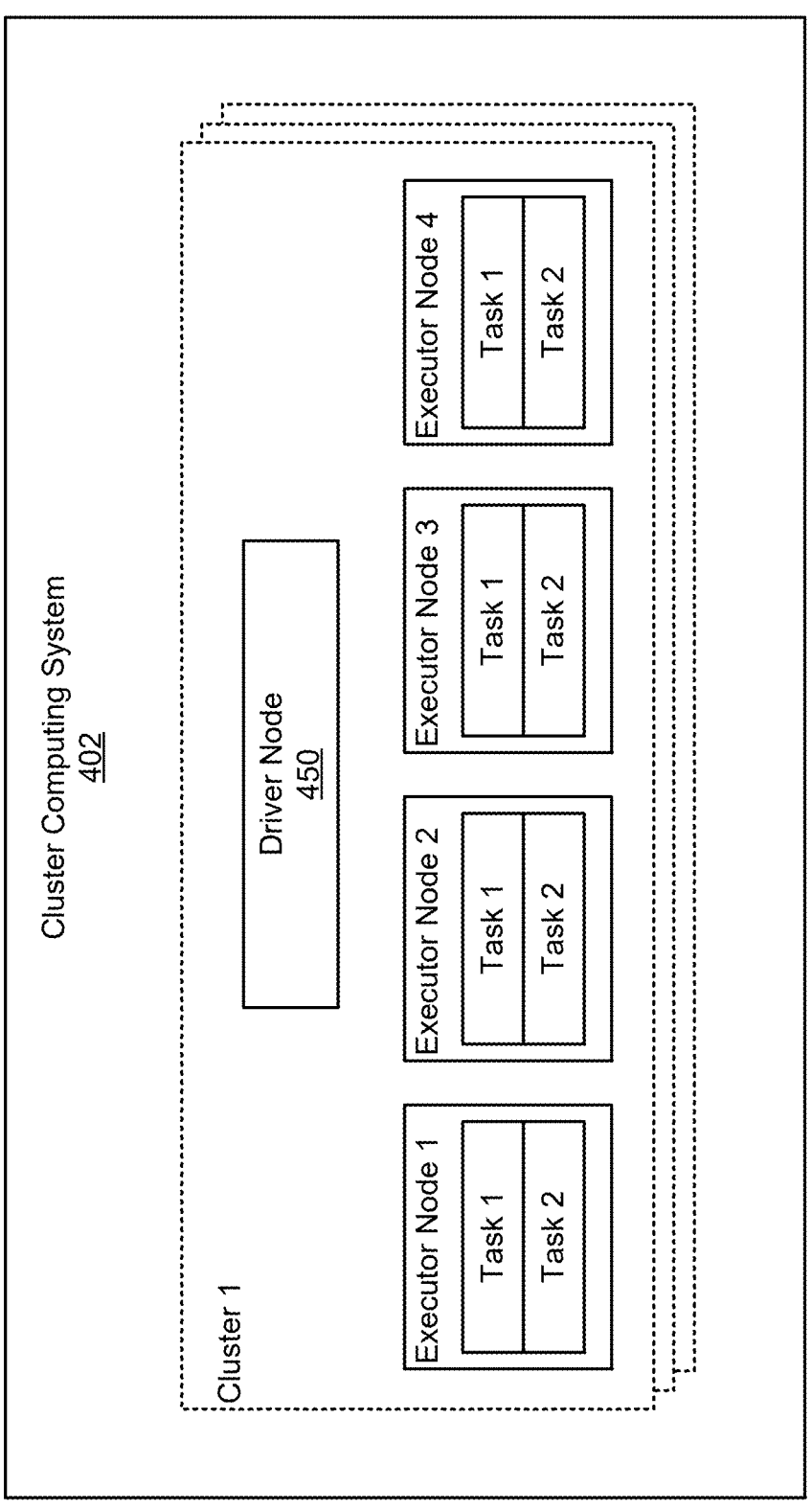
FIG. 4 illustrates a block diagram of an architecture of compute resources of the data layer, in accordance with an embodiment.

FIG. 4 is a block diagram of an architecture of compute resources 402 of the data layer 108 and/or control layer 106, in accordance with an embodiment. In some embodiments, the compute resources 402 of the data layer 108 includes driver node 450 and worker pool including multiple executor nodes. The nodes may be structured for execution by a computer system, e.g., 1000 having some or all of the components as described in FIG. 10, such that the computer system 1000 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

1. Process of Data Table Creation Using Lakehouse Federation

Figure 5:
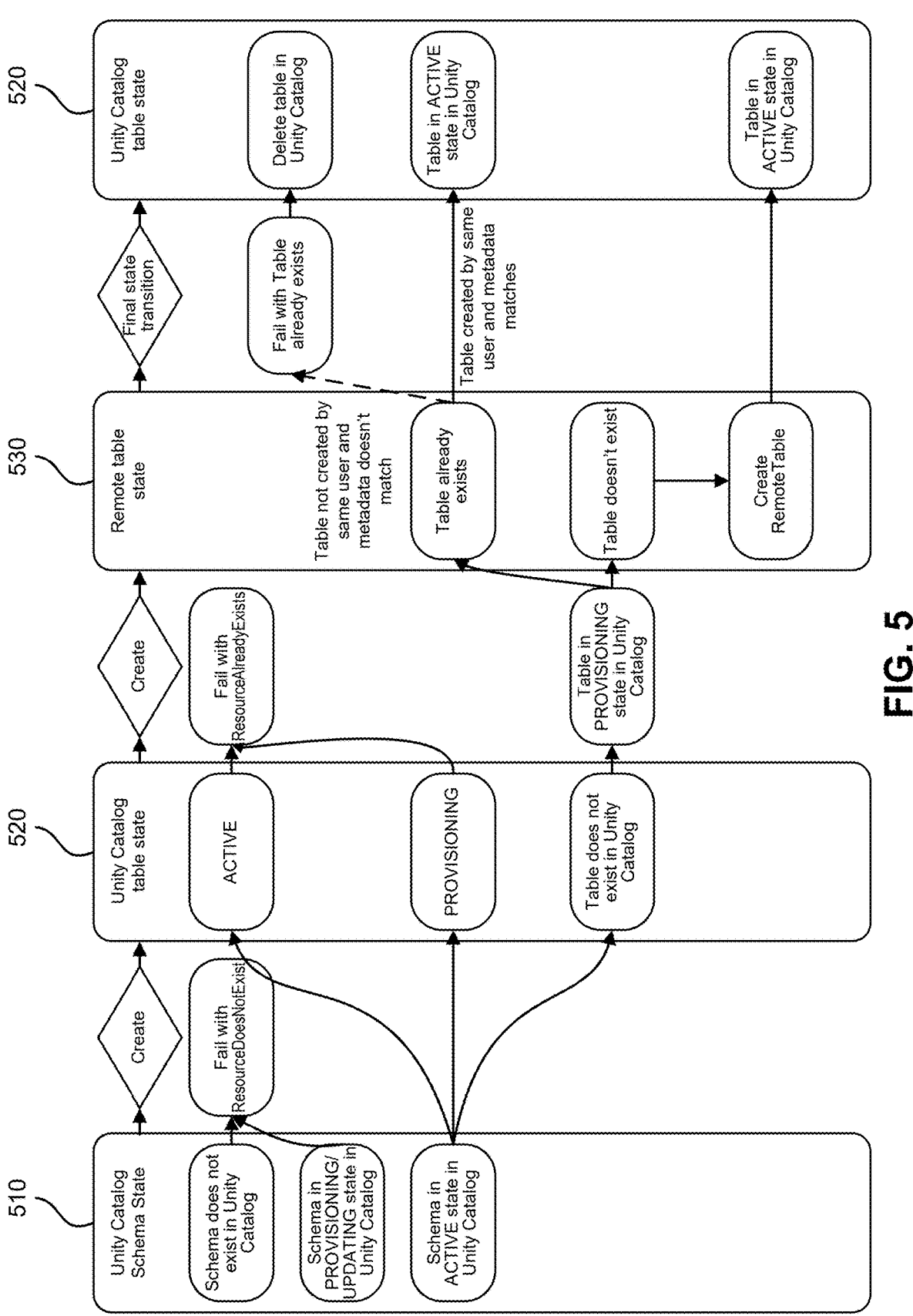
FIG. 5 illustrates a process for using a unity catalog module to create a data table in a remote data source, in accordance with an embodiment.

FIG. 5 illustrates a process for using a unity catalog module to create a data table in a remote data source, in accordance with an embodiment. The process shown in FIG. 5 may be performed by one or more components (e.g., the control layer 106) of a data processing system/service (e.g., the data processing service 102), such as the unity catalog module 345. Other entities may perform some or all of the steps in FIG. 5. The data processing service 102 as well as the other entities may include some or of the component of the machine (e.g., computer system) described in conjunction with FIG. 10. Embodiments may include different and/or additional steps, or perform the steps in different orders.

In some embodiments, the data processing service 102 may receive a request from a user to create a target data object (e.g., a target data table) in a remote data source. The unity catalog module 345 may determine whether the user has the permission to create the target data table. The unity catalog module 345 may check whether the user has privileges to access/use the catalog, access/use the schema, and/or create a data table. Upon determining that the user has the corresponding permission, the unity catalog module 345 may determine the state of the metadata corresponding to the target data table. In some implementations, the unity catalog module 345 may determine the state of the parent schema, e.g., unity catalog schema state 510. A parent schema is the schema under which a local data table is created, and the local data table is a data table in the metastore that corresponds to the target data table in the remote data source. For example, a target data table in a foreign data storage (e.g., remote data source) may correspond to a local data table B under schema A in the catalog of the metastore, e.g., foreign_catalog.schema_A.table_B. In this example, Table B is the local data table to be created, and Schema A is the parent schema for Table B. The unity catalog module 345 may determine the state of a schema or data table by determining the associated state identifier data structure. For example, a state identifier data structure may include values of "0", "1", and "2", "3", indicating a non-existence/failed state, a provisioning state, an active state, an updating state, respectively. As shown in FIG. 5, the unity catalog module 345 may determine the corresponding schema, e.g., Schema A, does not exist in the metastore, or the schema is having a provisioning/updating state. In this case, the target data table cannot be created under the target parent schema, and the unity catalog module 345 may determine that the request fails. Alternatively, the unity catalog module 345 may determine that the target schema exists in the metastore and has an active state. The unity catalog module 345 determines that the user has the permission to access/use the schema.

The unity catalog module 345 continues to check the state of the local data table (e.g., unity catalog table state 520) in the metastore. Similarly, the unity catalog module 345 may determine that the local data table is in an active state, a provisioning state, or does not exist in the metastore. If the local data table is in an active state or a provisioning state, it indicates that the target data table has already been created or is being created, and thus there is no need to create a same data table. In this case, the unity catalog module 345 may determine the request fails. Alternatively, if the local data table does not exist, and the unity catalog module 345 determines that the user has the permission to create the target data table, the unity catalog module 345 may create, in the metastore (e.g., local database), a local data table corresponding to the target data table, and set value (e.g., value=1) for the state identifier data structure for the local data table to indicate the local data table is in a provisioning state.

The unity catalog module 345 may transmit an instruction to the remote data source to create the target data table. Similarly, the unity catalog module 345 may determine the state of the target data table in the remote data source (e.g., remote table state 530). The unity catalog module 345 may determine that the target data table may exist or not exist in the remote data source. In one example, the unity catalog module 345 determines that the target data table does not exist in the remote data source, then the unity catalog module 345 may cause the remote data source to create the target data table. When the unity catalog module 345 determines the target data table has been successfully created in the remote data source, the unity catalog module 345 may change the state of the local data table in the metastore from the provisioning state to an active state. In another example, the unity catalog module 345 may determine that the target data table exists in the remote data source. If the existed target data table was created by the same user as the user requests to create the target data table, the unity catalog module 345 may determine that corresponding metadata matches and change the state of the local data table in the metastore from the provisioning state to an active state. Alternatively, the unity catalog module 345 may determine that the existed target data table was created by another user that is different from the user requests to create the target data table. In this case, the unity catalog module 345 may determine the metadata of the existed target data table does not match with the metadata of the requested target data table and determine that the request to create a target data table fails and deletes the created local data table in the metastore. Once the state of the local data table changes to "active", the unity catalog module 345 may allow the user to access the target data table (e.g., the created target data table in the remote data source) by accessing the local data table in the metastore.

2. Process of Data Table Alteration Using Lakehouse Federation

Figure 6:
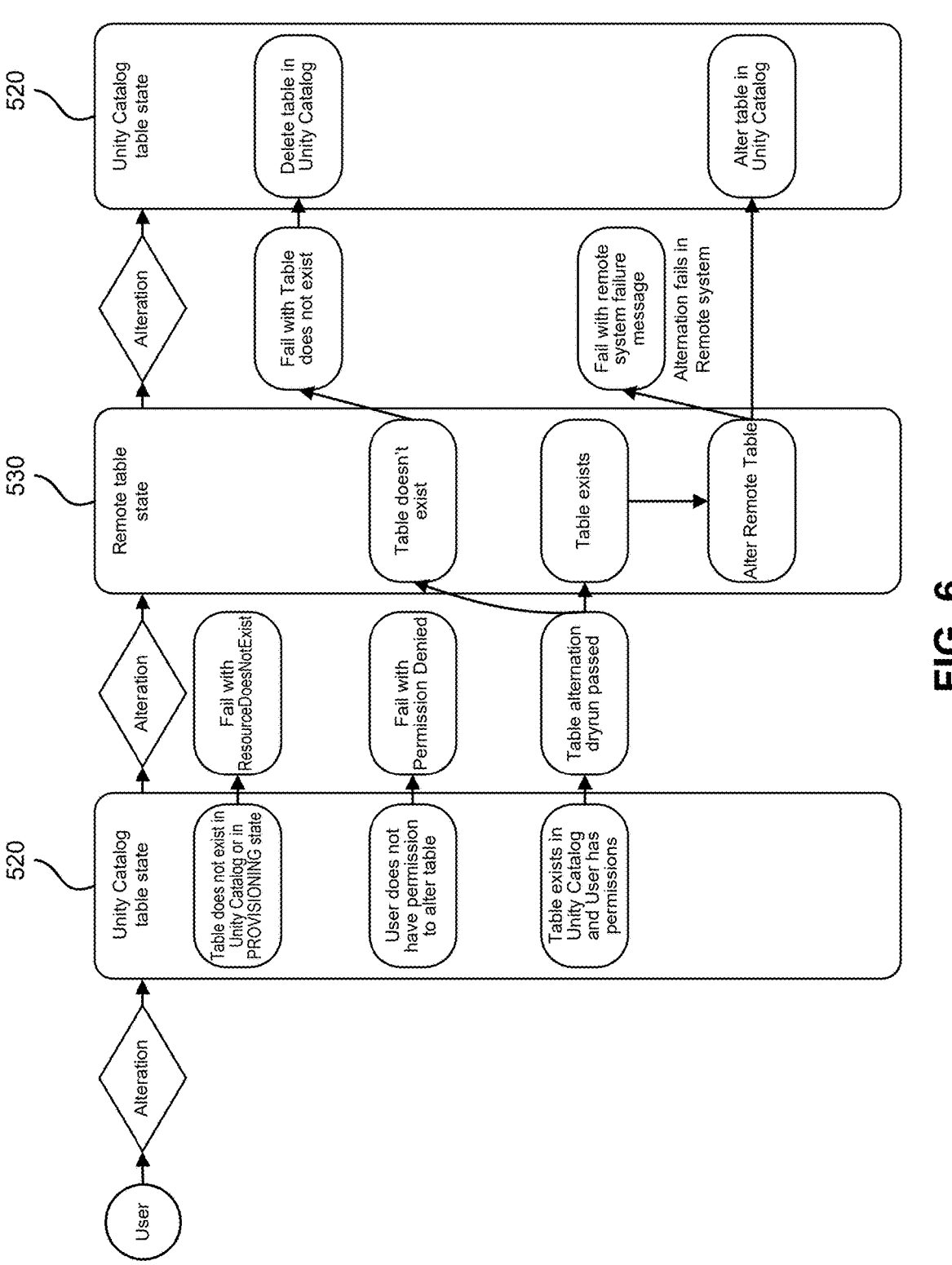
FIG. 6 illustrates a process for using a unity catalog module to create a data table in a remote data source, in accordance with an embodiment.

FIG. 6 illustrates a process for using a unity catalog module to create a data table in a remote data source, in accordance with an embodiment. The process shown in FIG. 6 may be performed by one or more components (e.g., the control layer 106) of a data processing system/service (e.g., the data processing service 102). Other entities may perform some or all of the steps in FIG. 6. The data processing service 102 as well as the other entities may include some or of the component of the machine (e.g., computer system) described in conjunction with FIG. 10. Embodiments may include different and/or additional steps, or perform the steps in different orders.

In some embodiments, the data processing service 102 may receive a request from a user to alter a target data table in a remote data source. For example, the user may request to alter a remote data table B under schema A in the catalog of a foreign data storage (e.g., remote data source), e.g., foreign_catalog.schema_A.table_B. The unity catalog module 345 may determine whether the user has the permission to alter the target data table. The unity catalog module 345 may determine whether the user has privileges to access/use the catalog, access/use the schema, and/or modify/alter a data table. Upon determining that the user has the corresponding permissions, the unity catalog module 345 may determine the state of a local data table (e.g., unity catalog table state 520) in the metastore. The local data table may be a data table in the metastore that corresponds to the target data table in the remote data source. For example, the unity catalog module 345 may determine that the local data table does not exist in the metastore or in a provisioning state, and the unity catalog module 345 may determine that the request to alter the target data table fails. In another example, the unity catalog module 345 may determine that the user does not have the permission to alter the target data table, and consequently denies the request to alter the target data table. In yet another example, the unity catalog module 345 may determine that the local data table exists in the metastore in an active state and the user has the permission to alter the target data table. In this case, the unity catalog module 345 may transmit an instruction to alter the target data table to the remote data source.

The unity catalog module 345 may determine the state of the target table in the remote data source (e.g., remote table state 530). Similarly, the unity catalog module 345 may determine the target data table exist or does not exist in the remote data source. When determining that the target data table does not exist in the remote data source, the unity catalog module 345 may determine the request to alter the target data table fails and delete the corresponding local data table in the metastore. When determining that the target data table exists in the remote data source, the unity catalog module 345 may cause the remote data source to alter the target data table based on the user's request. In some implementations, the unity catalog module 345 may receive signals indicating the alteration of the target data table fails in the remote data source, the unity catalog module 345 will not alter the corresponding local data table in the metastore. In some implementations, the unity catalog module 345 may receive signals indicating the alteration of the target data table is successful, the unity catalog module 345 may then alter the corresponding local data table based on the user's request.

In some embodiments, the request to alter a target data table may include deleting the target data table. In this case, to determine whether the user has the corresponding permissions may include determining whether the user is an owner of the target data table. In one example, the unity catalog module 345 may determine that the user is the owner of the target data table and thus has the permission to delete the target data table. The unity catalog module 345 then determines the state of a local data table (e.g., unity catalog table state 520) in the metastore. When the unity catalog module 345 may determine that the local data table does not exist in the metastore, the unity catalog module 345 determines that the request to delete the target data table fails. When the unity catalog module 345 determines that the local data table exists in the metastore in an active state or in a provisioning state, the unity catalog module 345 may transmit an instruction to delete the target data table to the remote data source.

Similarly, the unity catalog module 345 may determine the target data table exist or does not exist in the remote data source. When determining that the target data table does not exist in the remote data source, the unity catalog module 345 may delete the corresponding local data table in the metastore. When determining that the target data table exists in the remote data source, the unity catalog module 345 may cause the remote data source to delete the target data table. In some implementations, the unity catalog module 345 may receive signals indicating the deletion of the target data table fails in the remote data source, the unity catalog module 345 will not delete the corresponding local data table in the metastore. In some implementations, the unity catalog module 345 may receive signals indicating the deletion of the target data table is successful, the unity catalog module 345 may then delete the corresponding local data table based on the user's request.

3. Process of Schema Location Alteration

Figure 7:
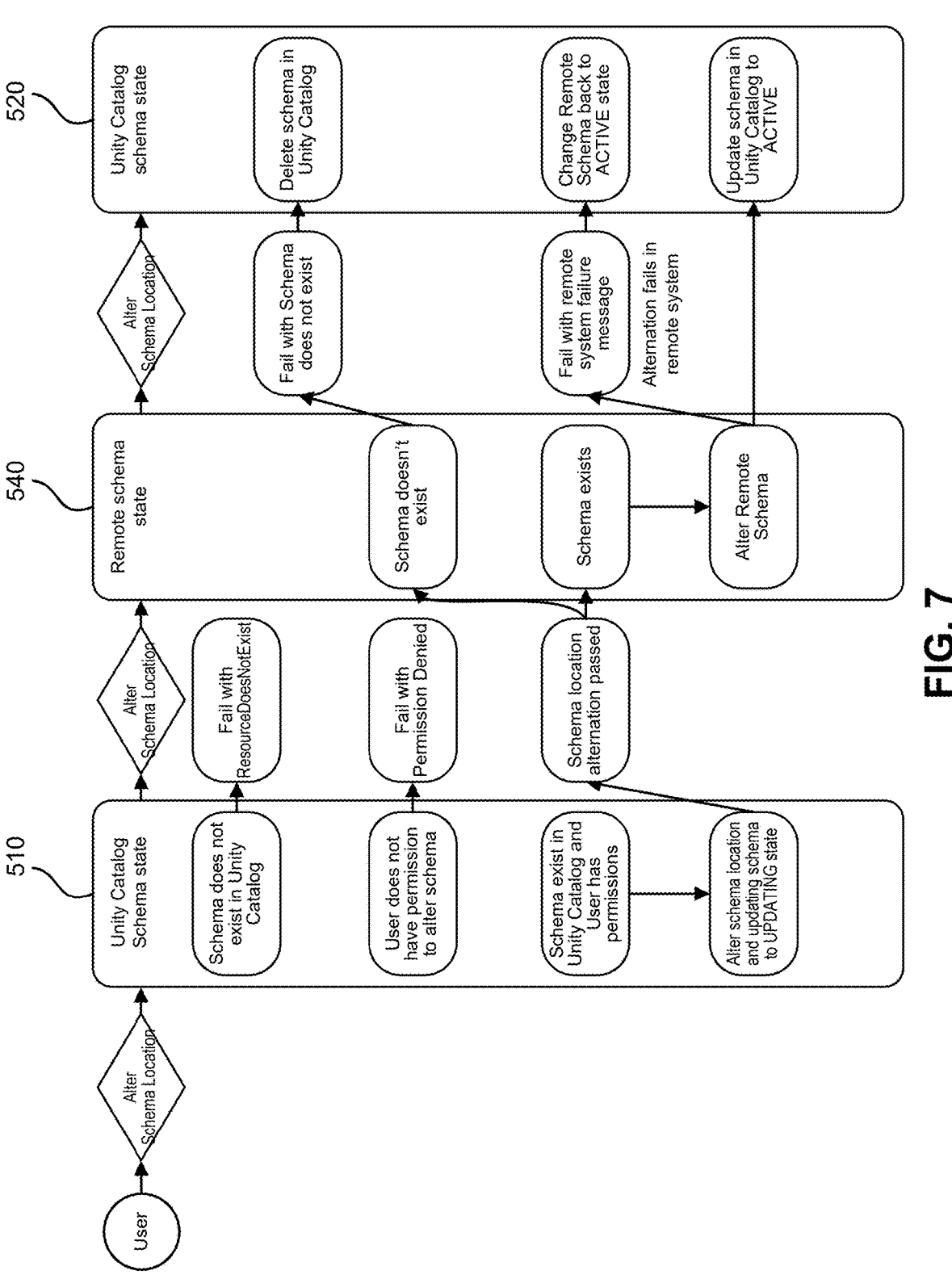
FIG. 7 illustrates a process for using a unity catalog module to alter the schema location in a remote data source, in accordance with an embodiment.

FIG. 7 illustrates a process for using a unity catalog module to alter the schema location in a remote data source, in accordance with an embodiment. The process shown in FIG. 7 may be performed by one or more components (e.g., the control layer 106) of a data processing system/service (e.g., the data processing service 102). Other entities may perform some or all of the steps in FIG. 7. The data processing service 102 as well as the other entities may include some or of the component of the machine (e.g., computer system) described in conjunction with FIG. 10. Embodiments may include different and/or additional steps, or perform the steps in different orders.

In some embodiments, the data processing service 102 may receive a request from a user to alter a target schema location in a remote data source. The unity catalog module 345 may determine the state of the schema in the metastore (e.g., unity catalog schema state 510) and whether the user has the permission to alter the target schema location. In one example, the unity catalog module 345 determines that the user does not have the corresponding permissions, the unity catalog module 345 may deny the request and determine the request to alter the schema location fails. In another example, the unity catalog module 345 may determine that the target schema does not exist in the metastore and determine that the request to alter the schema location fails. In yet another example, the unity catalog module 345 may determine that the target schema exists in the metastore and the user has the corresponding permission, the unity catalog module 345 may alter the schema location and change the state of the schema to an "updating" state.

The unity catalog module 345 may transmit an instruction to alter the schema state to the remote data source. The unity catalog module 345 may determine the state of the target schema in the remote data source (e.g., remote schema state 540). Similarly, the unity catalog module 345 may determine the target schema exist or does not exist in the remote data source. When determining that the target schema does not exist in the remote data source, the unity catalog module 345 may determine the request to alter the target schema location fails and delete the corresponding schema in the metastore. When determining that the target schema exists in the remote data source, the unity catalog module 345 may cause the remote data source to alter the target schema location based on the user's request. In some implementations, the unity catalog module 345 may receive signals indicating the alteration of the target schema location fails in the remote data source, the unity catalog module 345 will change the state of the corresponding schema in the metastore from the "updating" state to the "active" state, i.e. the schema location in the metastore does not change. In some implementations, the unity catalog module 345 may receive signals indicating the alteration of the target schema location is successful, the unity catalog module 345 may then update the corresponding schema location and change the state of the corresponding schema in the metastore from the "updat-ing" state to the "active" state, i.e., the schema location in the metastore is changed based on the user's request.

FIG. 8 is an example user interface 800 presenting information of data objects in a metastore, in accordance with an embodiment. As shown in FIG. 8, the user interface 800 may be organized into sections or cards, each showing a specific type of data, like states of data objects, project progress, etc. To keep track of the states of the data objects, the user interface 800 may present the states of a selected data object (e.g., catalog, schema, or data table). In some implementations, the user interface 800 may use color-coded symbols to illustrate the state of the data object. For example, green means the data table is in an active state, yellow means the data table is in a provisioning state, and red indicates the data table does not exist, and the like. In some embodiments, the user interface 800 may provide search and/or filter options in an interactable user interface element. A user may interact with the user interactable user interface element to select desired data object, identify specific information, narrow down the target options, etc. For example, by interacting with the interactable user interface element, the user may identify particular state update or error message associated with a target data table. In some embodiments, the user interface 800 may visualize information of the data objects in graphs and/or charts, such as pie charts, bar graphs, line graphs, etc. In some embodiments, the user interface 800 may illustrate the states of the data objects over a period of time, displaying information such as times stamps, time to live (TTL), last update time, update interval, etc. In some implementations, the user interface 800 may provide a notification informing states of the selected data object, e.g., a data table changing from a provisioning state to an active state, and the like.

Creating a Target Data Table Via Unity Catalog

FIG. 9A is a flowchart of a method for creating a target data table in a remote data source by using the unity catalog, in accordance with an embodiment. The process shown in FIG. 9A may be performed by one or more components (e.g., the control layer 106) of a data processing system/service (e.g., the data processing service 102). Other entities may perform some or all of the steps in FIG. 9A. The data processing service 102 as well as the other entities may include some or of the component of the machine (e.g., computer system) described in conjunction with FIG. 10. Embodiments may include different and/or additional steps, or perform the steps in different orders.

As shown in FIG. 9A, the data processing service 102 receives 902 a request to create a target data table in a remote data source. The request may be from a client device of a user. The data processing service 102 determines 904 whether the user of the client device has a permission to create a local data table in a local database. The local data table in the local database corresponds to the target data table in the remote data source. Responsive to determining that the user has the permission, the data processing service 102 may create 906 the local data table in the local database. The local data table is associated with a state identifier data structure. The data processing service 102 may set 908 the state identifier data structure for the local data table to a provisioning state to indicate that the target data table is being provisioned in the remote data source. The data processing service 102 transmits 910 an instruction to create the target data table in the remote data source. Responsive to determining that the target data table is created in the remoted data source successfully, the data processing service 102 may change 912 the local data table from the provisioning state to an active state and allow 914 the user to access the target data table by accessing the local data table in the local database.

In some embodiments, the data processing service 102 may receive a second request to create a second target data table in the remote data source. The data processing service 102 may determine whether the second target data table exists in the remote data source. Responsive to determining that the second target data table exists in the remote data source and that the second target data table was created by a different user from the user, the data processing service 102 may delete, a second local data table that corresponds to the second target data table from the local database. In some implementations, responsive to determining that the second target data table exists in the remote data source and that the second target data table was created by the user, the data processing service 102 may change a state associated with the second local data table from a provisioning state to an active state. The second local data table may be a data table in the local database that corresponds to the second target data table.

FIG. 9B is a flowchart of a method for altering a target data table in a remote data source by using the unity catalog, in accordance with an embodiment. The process shown in FIG. 9B may be performed by one or more components (e.g., the control layer 106) of a data processing system/service (e.g., the data processing service 102). Other entities may perform some or all of the steps in FIG. 9B. The data processing service 102 as well as the other entities may include some or of the component of the machine (e.g., computer system) described in conjunction with FIG. 10. Embodiments may include different and/or additional steps, or perform the steps in different orders.

As shown in FIG. 9B, the data processing service 102 receives 922, from a client device of a user, a request to alter a target data table in a remote data source. The data processing service 102 may determine 924 whether the user of the client device has a permission to alter the target data table by verifying access privileges of the user. The data processing service 102 identifies 926 a local data table corresponding to the target data table in a local database and a state of the local data table indicated in a state identifier data structure associated with the local data table. Responsive to a determination that the user has permission and state of the local data table is not in a provisioning state, the data processing service 102 identifies 928 whether the target data table corresponding to the local data table exists in the remote data source. The data processing service 102 transmits 930 an instruction to alter the target data table in the remote data source. Responsive to determining that the target data table is successfully altered in the remoted data source successfully, the data processing service 102 makes 932 the alterations to the local data table.

FIG. 9C is a flowchart of a method for creating a target data table in a remote data source by using the unity catalog, in accordance with an embodiment. The process shown in FIG. 9C may be performed by one or more components (e.g., the control layer 106) of a data processing system/service (e.g., the data processing service 102). Other entities may perform some or all of the steps in FIG. 9C. The data processing service 102 as well as the other entities may include some or of the component of the machine (e.g., computer system) described in conjunction with FIG. 10. Embodiments may include different and/or additional steps, or perform the steps in different orders.

As shown in FIG. 9C, the data processing service 102 receives 942 from a client device of a user, a request to update a location of a target schema in a remote data source. The data processing service 102 may identify 944 a local schema corresponding to the target schema in a local database and a state of the local schema indicated in a state identifier data structure associated with the local schema. The data processing service 102 determines 946 whether the user of the client device has a permission to update the location of the target schema. Responsive to determining that the user has permission, the data processing service 102 updates 948 a location of the local schema and sets 950 the state identifier data structure for the local schema to an updating state to indicate that the location of the target schema is being updated at the remote data source. Responsive to a determination that the user has permission, the data processing service 102 identifies 952 whether the target schema corresponding to the local schema exists in the remote data source. Responsive to determining that the location of the target schema is updated in the remoted data source successfully, the data processing service 102 changes 954 the state of the local schema to an active state.

Figure 10:
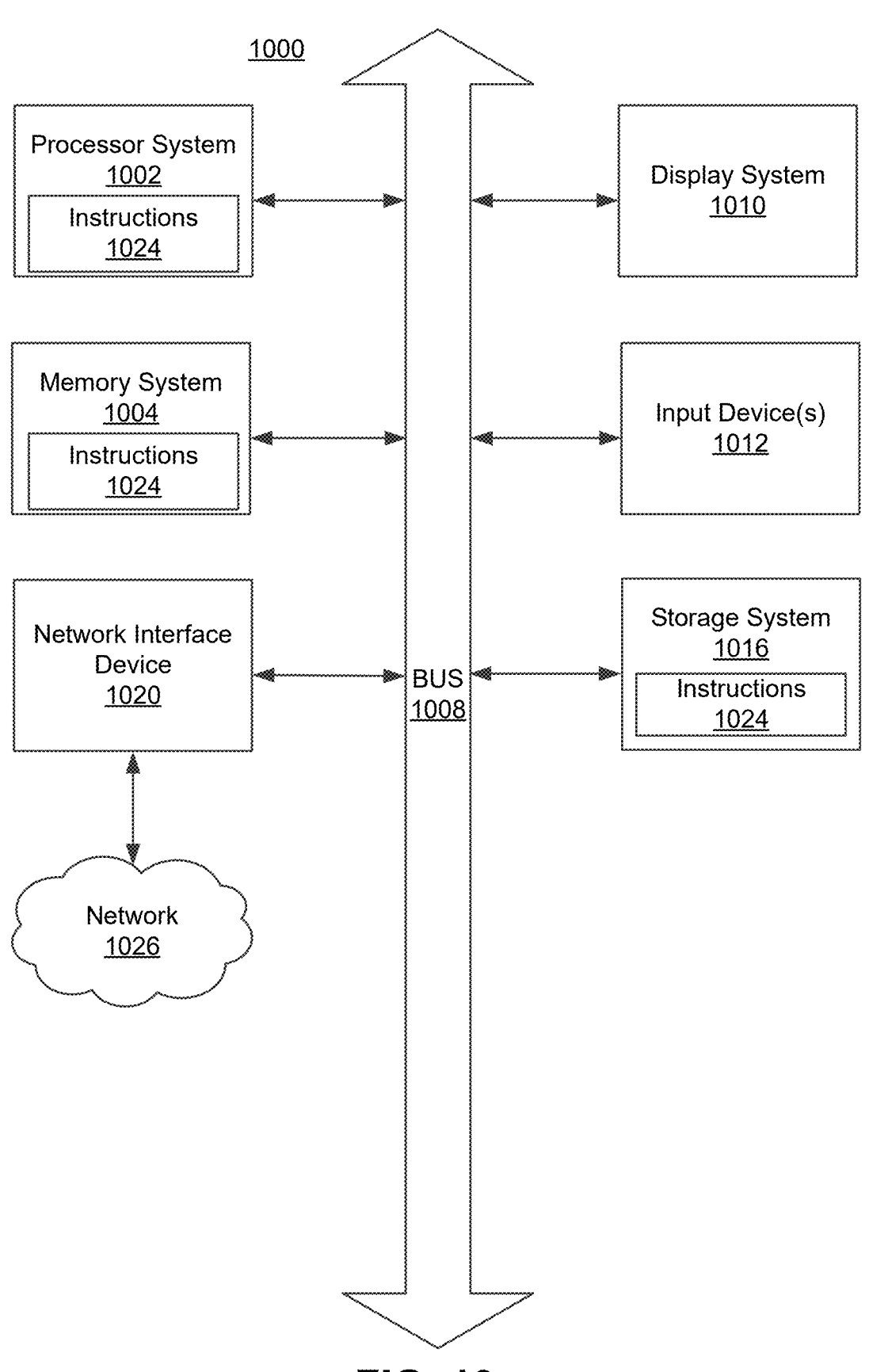
FIG. 10 is a block diagram illustrating an example machine to read and execute computer readable instructions, in accordance with an embodiment.

Turning now to FIG. 10, illustrated is an example machine to read and execute computer readable instructions, in accordance with an embodiment. Specifically, FIG. 10 shows a diagrammatic representation of the data processing service 102 (and/or data processing system) in the example form of a computer system 1000. The computer system 1000 is structured and configured to operate through one or more other systems (or subsystems) as described herein. The computer system 1000 can be used to execute instructions 1024 (e.g., program code or software) for causing the machine (or some or all of the components thereof) to perform any one or more of the methodologies (or processes) described herein. In executing the instructions, the computer system 1000 operates in a specific manner as per the functionality described. The computer system 1000 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 1000 may be a server computer, a client computer, a personal computer (PC), a tablet PC, a smartphone, an internet of things (IoT) appliance, a network router, switch or bridge, or other machine capable of executing instructions 1024 (sequential or otherwise) that enable actions as set forth by the instructions 1024. Further, while only a single machine is illustrated, the term "machine" shall also be taken to include any collection of machines that individually or jointly execute instructions 1024 to perform any one or more of the methodologies discussed herein.

The example computer system 1000 includes a processing system 1002. The processor system 1002 includes one or more processors. The processor system 1002 may include, for example, a central processing unit (CPU), a graphics processing unit (GPU), a neural network processor (NPU), a digital signal processor (DSP), a controller, a state machine, one or more application specific integrated circuits (ASICs), one or more radio-frequency integrated circuits (RFICs), or any combination of these. The processor system 1002 executes an operating system for the computing system 1000. The computer system 1000 also includes a memory system 1004. The memory system 1004 may include or more memories (e.g., dynamic random access memory (RAM), static RAM, cache memory). The computer system 1000 may include a storage system 1016 that includes one or more machine readable storage devices (e.g., magnetic disk drive, optical disk drive, solid state memory disk drive).

The storage unit 1016 stores instructions 1024 (e.g., software) embodying any one or more of the methodologies or functions described herein. For example, the instructions 1024 may include instructions for implementing the functionalities of the transaction module 330 and/or the file management module 335. The instructions 1024 may also reside, completely or at least partially, within the memory system 1004 or within the processing system 1002 (e.g., within a processor cache memory) during execution thereof by the computer system 1000, the main memory 1004 and the processor system 1002 also constituting machine-readable media. The instructions 1024 may be transmitted or received over a network 1026, such as the network 1026, via the network interface device 1020.

The storage system 1016 should be taken to include a single medium or multiple media (e.g., a centralized or distributed database, or associated caches and servers communicatively coupled through the network interface system 1020) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 1000 can include a display system 1010. The display system 1010 may driver firmware (or code) to enable rendering on one or more visual devices, e.g., drive a plasma display panel (PDP), a liquid crystal display (LCD), or a projector. The computer system 1000 also may include one or more input/output systems 1012. The input/output (IO) systems 1012 may include input devices (e.g., a keyboard, mouse (or trackpad), a pen (or stylus), microphone) or output devices (e.g., a speaker). The computer system 1000 also may include a network interface system 1020. The network interface system 1020 may include one or more network devices that are configured to communicate with an external network 1026. The external network 1026 may be a wired (e.g., ethernet) or wireless (e.g., WiFi, BLUETOOTH, near field communication (NFC).

The processor system 1002, the memory system 1004, the storage system 1016, the display system 1010, the IO systems 1012, and the network interface system 1020 are communicatively coupled via a computing bus 1008.

ADDITIONAL CONSIDERATIONS

The disclosed configurations provide a method for creating a data table in a remote data source via a metastore in a local database. The method creates a local data table in the local database which corresponds to the target data table in the remote data source. The method creates the local data table with a state identifier data structure and sets the state identifier data structure to a provisioning state to indicate that the target data table is being provisioned. Once the target data table is created in the remoted data source successfully, the method changes the local data table from the provisioning state to an active state indicating that the user can access the target data table in the remote data source by accessing the local data table in the metastore of the local database.

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:

receiving, from a client device of a user, a request to create a target data table in a remote data source;

determining whether the user of the client device has a permission to create, in a local database, a local data table corresponding to the target data table;

responsive to determining that the user has the permission, creating, in the local database, the local data table, wherein the local data table is associated with a state identifier data structure;

setting the state identifier data structure for the local data table to a provisioning state to indicate that the target data table is being provisioned in the remote data source;

transmitting, to the remoted data source, an instruction to create the target data table in the remote data source;

responsive to determining that the target data table is created in the remoted data source successfully, changing the local data table from the provisioning state to an active state; and allowing the user to access the target data table by accessing the local data table in the local database.

2. The method of claim 1, wherein determining whether the user of the client device has a permission to create a local data table comprises:

determining whether the user has a permission to access a catalog and a schema under which the local data table is to be created in the local database.

3. The method of claim 1, further comprising:

determining a state of a schema associated with target data table in the local database from a second state identifier data structure associated with the schema; and responsive to a determination that the state of the schema is in an active state, creating the local data table in the local database.

4. The method of claim 1, further comprising:

determining whether the local data table exists in the local database; and responsive to a determination that the local data table does not exist in the local database, creating the local data table in the local database.

5. The method of claim 1, wherein determining that the target data table is created in the remoted data source successfully comprises:

determining that the target data table was not previously created in the remote data source before the target data table is created in the remote data source.

6. The method of claim 1, further comprising:

receiving, from the client device of the user, a second request to create a second target data table in the remote data source;

determining whether the second target data table exists in the remote data source; and responsive to determining that the second target data table exists in the remote data source and that the second target data table was created by a different user from the user, deleting, from the local database, a first local data table that corresponds to the second target data table.

7. The method of claim 1, further comprising:

receiving, from the client device of the user, a second request to create a second target data table in the remote data source;

determining whether the second target data table exists in the remote data source; and responsive to determining that the second target data table exists in the remote data source and that the second target data table was created by the user, changing a state associated with the first local data table from a provisioning state to an active state, the first local data table being a data table in the local database that corresponds to the second target data table.

8. A non-transitory computer readable storage medium comprising stored program code, the program code comprising instructions, the instructions when executed causes a processor system to:

receive, from a client device of a user, a request to create a target data table in a remote data source;

determine whether the user of the client device has a permission to create, in a local database, a local data table corresponding to the target data table;

responsive to determining that the user has the permission, create, in the local database, the local data table, wherein the local data table is associated with a state identifier data structure;

set the state identifier data structure for the local data table to a provisioning state to indicate that the target data table is being provisioned in the remote data source;

transmit, to the remoted data source, an instruction to create the target data table in the remote data source;

responsive to determining that the target data table is created in the remoted data source successfully, change the local data table from the provisioning state to an active state; and allow the user to access the target data table by accessing the local data table in the local database.

9. The non-transitory computer readable storage medium of claim 8, wherein the instructions to determine whether the user of the client device has a permission to create a local data table further comprise stored instructions when executed causes the processor system to:

determine whether the user has a permission to access a catalog and a schema under which the local data table is to be created in the local database.

10. The non-transitory computer readable storage medium of claim 8, wherein the instructions when executed causes the processor system to:

determine a state of a schema associated with target data table in the local database from a second state identifier data structure associated with the schema; and responsive to a determination that the state of the schema is in an active state, creating the local data table in the local database.

11. The non-transitory computer readable storage medium of claim 8, wherein the instructions when executed causes the processor system to:

determine whether the local data table exists in the local database; and responsive to a determination that the local data table does not exist in the local database, creating the local data table in the local database.

12. The non-transitory computer readable storage medium of claim 8, wherein the instructions to determine that the target data table is created in the remoted data source successfully further comprise stored instructions when executed causes the processor system to:

determine that the target data table was not previously created in the remote data source before the target data table is created in the remote data source.

13. The non-transitory computer readable storage medium of claim 8, wherein the instructions when executed causes the processor system to:

receive, from the client device of the user, a second request to create a second target data table in the remote data source;

determine whether the second target data table exists in the remote data source; and responsive to determining that the second target data table exists in the remote data source and that the second target data table was created by a different user from the user, delete, from the local database, a first local data table that corresponds to the second target data table.

14. The non-transitory computer readable storage medium of claim 8, wherein the instructions when executed causes the processor system to:

receive, from the client device of the user, a second request to create a second target data table in the remote data source;

determine whether the second target data table exists in the remote data source; and responsive to determining that the second target data table exists in the remote data source and that the second target data table was created by the user, change a state associated with a first local data table from a provisioning state to an active state, the first local data table being a data table in the local database that corresponds to the second target data table.

15. A system comprising:

one or more computer processors; and one or more computer-readable mediums storing instructions that, when executed by the one or more computer processors, cause the system to:

receive, from a client device of a user, a request to create a target data table in a remote data source;

determine whether the user of the client device has a permission to create, in a local database, a local data table corresponding to the target data table;

responsive to determining that the user has the permission, create, in the local database, the local data table, wherein the local data table is associated with a state identifier data structure;

set the state identifier data structure for the local data table to a provisioning state to indicate that the target data table is being provisioned in the remote data source;

transmit, to the remoted data source, an instruction to create the target data table in the remote data source;

responsive to determining that the target data table is created in the remoted data source successfully, change the local data table from the provisioning state to an active state; and allow the user to access the target data table by accessing the local data table in the local database.

16. The system of claim 15, wherein the instructions to determine whether the user of the client device has a permission to create a local data table further comprise stored instructions when executed by the one or more computer processors, cause the system to:

determine whether the user has a permission to access a catalog and a schema under which the local data table is to be created in the local database.

17. The system of claim 15, wherein the instructions when executed by the one or more computer processors, cause the system to:

determine a state of a schema associated with target data table in the local database from a second state identifier data structure associated with the schema; and responsive to a determination that the state of the schema is in an active state, create the local data table in the local database.

18. The system of claim 15, wherein the instructions when executed by the one or more computer processors, cause the system to:

determine whether the local data table exists in the local database; and responsive to a determination that the local data table does not exist in the local database, creating the local data table in the local database.

19. The system of claim 15, wherein the instructions when executed by the one or more computer processors, cause the system to:

receive, from the client device of the user, a second request to create a second target data table in the remote data source;

determine whether the second target data table exists in the remote data source; and responsive to determining that the second target data table exists in the remote data source and that the second target data table was created by a different user from the user, delete, from the local database, a first local data table that corresponds to the second target data table.

20. The system of claim 15, wherein the instructions when executed by the one or more computer processors, cause the system to:

receive, from the client device of the user, a second request to create a second target data table in the remote data source;

determine whether the second target data table exists in the remote data source; and responsive to determining that the second target data table exists in the remote data source and that the second target data table was created by the user, change a state associated with a first local data table from a provisioning state to an active state, the first local data table being a data table in the local database that corresponds to the second target data table.

* * * * *